United States Patent Office 3,063,248
Patented Nov. 13, 1962

3,063,248
METHOD OF SHIPPING FROZEN FOOD
Willard L. Morrison, Lake Forest, Ill., assignor, by mesne assignments, to Liquefreeze Company, Inc., New York, N.Y., a corporation of New York
No Drawing. Filed Oct. 30, 1958, Ser. No. 770,609
2 Claims. (Cl. 62—64)

My invention relates to improvements in method of shipping frozen food and has for one object to provide a method which without substantial change makes it possible to use the usual type of insulated refrigerator car for shipment without icing between points of departure and terminal of frozen food, the temperature of which may be maintained in the order of zero degrees F. or below.

Thousands of refrigerator cars are at present in operation with bunkers at the ends of the car filled with ice and salt, the ice melting to brine at temperatures approaching zero degrees F., the cold air circulating through the car cooled by the salt ice mixture to a point perhaps in the order of 15 to 20 degrees F.

This arrangement is satisfactory provided no harm is done if the food rises to temperatures close to the freezing point but great harm is done if frozen foods are allowed to rise to such temperature. In the past, it has been customary to stop the car at predetermined intervals to replace the ice and salt in the hope of maintaining the temperature somewhere in the order of 15 to 20 degrees F. As the ice and salt melts, the mass available as a coolant decreases so while optimum temperatures may be in the order of fifteen degrees, much of the time the temperature will approach, if not actually exceed the freezing point and this is fatal for frozen food if it is to be shipped.

Frozen food is therefore shipped by being packed in its frozen condition to temperatures perhaps in the order of zero degrees F. in such refrigerator cars which are carefully iced in the hope that the temperature of the frozen food will in the lapsed time of shipment not rise to the danger point, or, in other words, the maximum tolerable upper temperature limit. Unfortunately much of it frequently does and great spoilage results.

Ice contains almost one hundred percent water. Frozen foods contain large quantities of water but by no means one hundred percent. Frozen foods contain what is called water of composition and every frozen food contains substantial amounts of water. The specific heat of water ice is .5. The specific heat of frozen food is in the order of .35 so as a means for storing cold, ice is a more effective storage than is the food itself.

I propose to make use of this water of composition both in the ice and in the food because the volume of food is much greater than the volume of ice in a refrigerator car even though the percentage of the water in the food is less than one hundred percent and so differs from the percentage of water in ice which is one hundred. I propose, therefore, to cool the water ice and salt and the foods down to a temperature far below zero degrees, the temperature at which frozen food is ordinarily shipped. I propose to do this by flooding the ice and the food with liquid nitrogen at atmospheric pressure and approximately —320 degrees F., an innocuous and non-deleterious refrigerant. By flooding the ice and the food, I can assure that the outer peripheries of every separate particle of ice, every separate package of food will be in wetted direct contact with the flood of nitrogen. If this flooding is continued a sufficient length of time, the temperature of the entire body will be reduced far below the starting point and all of the water of composition both in the ice and in the food will be reduced to the desired far below zero temperature.

It has been proposed in the past to cool food with cold gas, perhaps air, perhaps other gases and that is practicable when individual packages are separately exposed to a cold air or gas tunnel but experience has taught that temperatures much below 10 degrees F. are practically unobtainable and when an effort is made to cool packaged foods in a shipper container such as a refrigerator car by cold gas, it is hopeless. The gas will not penetrate between the packages, will not contact all the surfaces and heat exchange with the gas is so slow that it is hopeless to try to lower the temperature of the assembled mass of ice and food appreciably below the zero temperature of salt and ice and the zero temperature of the food as it comes from the freezer.

It has been proposed to spray liquids on packages of food. Again, the difficulty is that when spraying of the cold boiling liquid even nitrogen is tried the finely divided particles vaporize so rapidly that in actual fact most if not all of the cooling is by heat exchange not with the liquid but with the gas and heat exchange with the gas is notoriously less efficient than with the liquid especially because of the fact that when heat exchange with the gas takes place and the gas is evaporated, it is the latent heat of evaporation in the concentrated liquid as applied to the surface of the food or ice that produces the desired result.

It has been proposed to spray liquid carbon dioxide into a freight car, that is to maintain carbon dioxide at a pressure such that it remains a liquid up to the spray nozzle at which point pressure drop results in immediate flashing into snow and vapor of the carbon dioxide so the carbon dioxide snow cools by heat exchange if it happens to touch any of the particles of food or ice but most of its cooling is as a result of heat exchange with the vapor or gas because the snow cannot penetrate into the spaces between the ice fragments and the spaces between the food packages.

Only when the ice and the food is flooded with the liquid is it possible to wet all the surfaces long enough and continuously enough to insure that all of the water of composition is lowered to the desired below zero temperature.

When this is done, provided the temperature has been properly selected with reference to the rate of heat inflow from outside through the insulation, the temperature of the ambient air and the time of travel, then it is possible to ship the food with the ice and salt to destination without the food contents of the car rising above the danger point.

What happens is that as the car goes on its way, heat flows in through the insulation and tends to warm both the ice and the food. The ice having higher specific heat tends to warm less rapidly. The food having lower specific heat tends to warm more rapidly but meanwhile as the car goes on its way, effective circulation of the atmosphere in the car tends to bring the cold from the ice into and back to the food since the ice and food are in fluid communication with one another, thus resisting the differential warm up of the food. This situation prevails until perhaps at last a point is reached where the ice and the food have risen substantially to zero degrees F. From then on the ice and salt alone take over and the ice then melting at zero degrees F. furnishes a source of cold for the end of the trip to insure that the atmosphere of the car will not rise above the danger point.

Preferably of course the temperature and time will be so adjusted that little if any of the melting of the ice occurs during shipment but the melting of the ice continues as the car is unloaded so that during standing idle, unloading the food will not be warmed above the danger point.

I claim:

1. A method of maintaining perishables below their maximum tolerable upper temperature limit in a conventional shipping vehicle such as a railway car for a given period of time, said method including the steps of, placing a refrigerant having a melting point below the maximum tolerable upper temperature limit of the perishables and a greater specific heat than the perishables, such as brine, in fluid communication with the perishables, reducing the temperature of the refrigerant and perishables to a point below the melting point of the refrigerant by flooding the refrigerant and perishables with liquid nitrogen at substantially atmospheric pressure, warming the perishables at a slower rate than the rate normally resulting from exposure of the perishables to ambient temperatures by circulating a cooling fluid between and in heat exchange relationship with the perishables and the refrigerant of higher specific heat, and, upon attainment of the melting point of the refrigerant, maintaining the temperature of the perishables substantially constant during the time the solid refrigerant melts, the refrigerant, or the perishables, or both, being initially subjected to a temperature sufficiently low that subsequent warming due, firstly, to heat absorption by the refrigerant at temperatures below its melting point, and, secondly, to removal of the latent heat of the refrigerant, is completed after the lapse of the aforementioned given period of time to thereby maintain the perishables below their maximum tolerable upper temperature limit for the given period of time.

2. The method of claim 1 further characterized in that the perishables are frozen at the time of their placement in fluid communication with the refrigerant.

References Cited in the file of this patent

UNITED STATES PATENTS

| | | |
|---|---|---|
| 2,337,600 | Harris | Dec. 28, 1943 |
| 2,381,796 | Williams | Aug. 7, 1945 |
| 2,501,141 | Plummer et al. | Mar. 21, 1950 |
| 2,586,893 | Westling | Feb. 26, 1952 |
| 2,618,939 | Morrison | Nov. 25, 1952 |